March 29, 1960

D. J. GRANT 2,930,280

HIGH SPEED DRUM CAMERA

Filed April 6, 1956

INVENTOR.
DANIEL J. GRANT
BY
ATTORNEYS

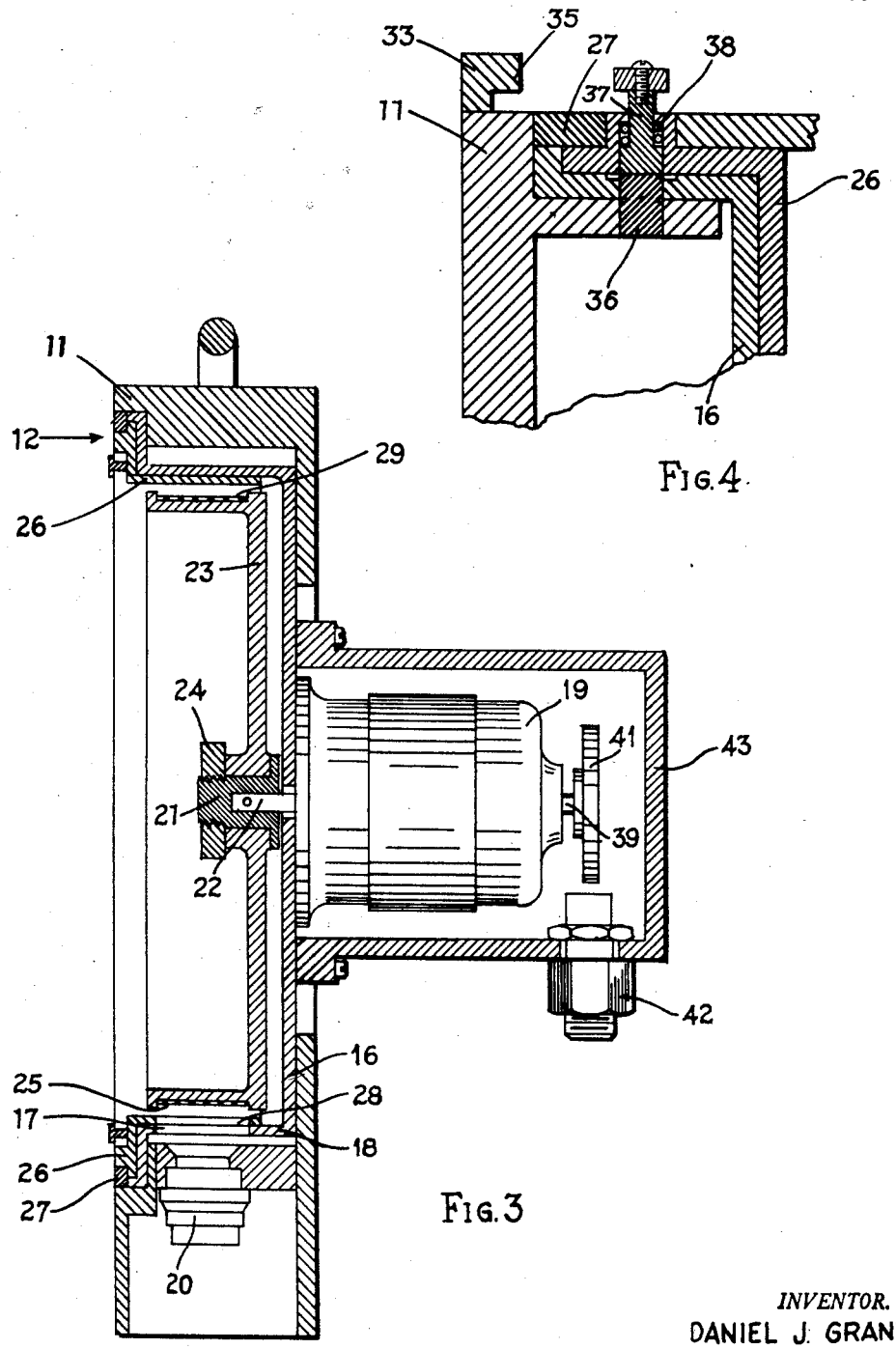

March 29, 1960 D. J. GRANT 2,930,280
HIGH SPEED DRUM CAMERA
Filed April 6, 1956 3 Sheets-Sheet 3

INVENTOR.
DANIEL J. GRANT
BY
ATTORNEYS

United States Patent Office 2,930,280
Patented Mar. 29, 1960

2,930,280

HIGH SPEED DRUM CAMERA

Daniel J. Grant, Takoma Park, Md., assignor to the United States of America as represented by the Secretary of the Navy Application April 6, 1956, Serial No. 576,749

12 Claims. (Cl. 88—16)

(Granted under Title 35, U.S. Code (1952), sec. 266)

The invention described herein may be manufactured and used by or for the Government of the United States of America for governmental purposes without the payment of any royalties thereon or therefor.

The present invention relates to high speed cameras and more particularly to high speed cameras that have magazines for retaining film.

Heretofore most cameras of the magazine type are provided with two spools and the film is transferred from one spool to the other as it is exposed. The cameras usually had to be opened in the dark so as to not expose the film. The heretofore known type of drum cameras are comparatively slow, particularly when it is desired to photograph the trace of an oscilloscope.

The present invention uses a single drum or spool for retaining film and permits the film to travel at speeds as high as 125 feet per second. The novel design of drum includes a shutter arrangement that can only be opened when the drum is inside the camera housing, and thus accidental exposure of film is avoided.

The complete unit, as disclosed herein, consists of two main assemblies which are referred to as the magazine assembly and the camera housing. The magazine assembly consists of a magazine housing which contains a rotary film drum and means for driving the rotary film drum at high speed. A rotary shutter is mounted within the magazine housing and is manually operable. The magazine assembly can be loaded with film in a darkroom, the rotary shutter being closed, and then can be inserted into the camera housing at any time. A locking arrangement prevents accidental opening of the shutter, as the shutter can only be opened when the magazine housing is mounted within the camera housing. It is therefore a general object of the present invention to provide a high speed camera that permits film to be retained in a magazine.

Another object of the present invention is to provide a single drum for retaining film inside a magazine.

Other objects and many of the attendant advantages of this invention will be readily appreciated as the same becomes better understood by reference to the following detailed description when considered in connection with the accompanying drawings wherein:

Figure 3 is a sectional view taken along lines 3—3 of Figure 2;

Figure 4 is a partial sectional view taken along lines 4—4 of Figure 2; and

Figure 1:
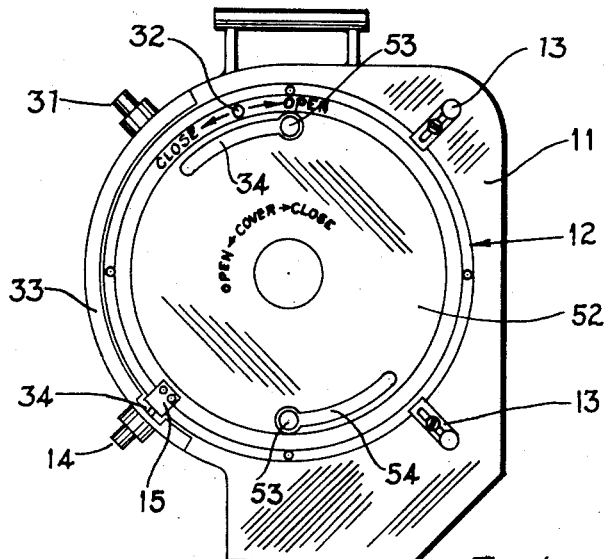
Figure 1 is a view showing the magazine assembly mounted within the camera housing.
Figure 2:
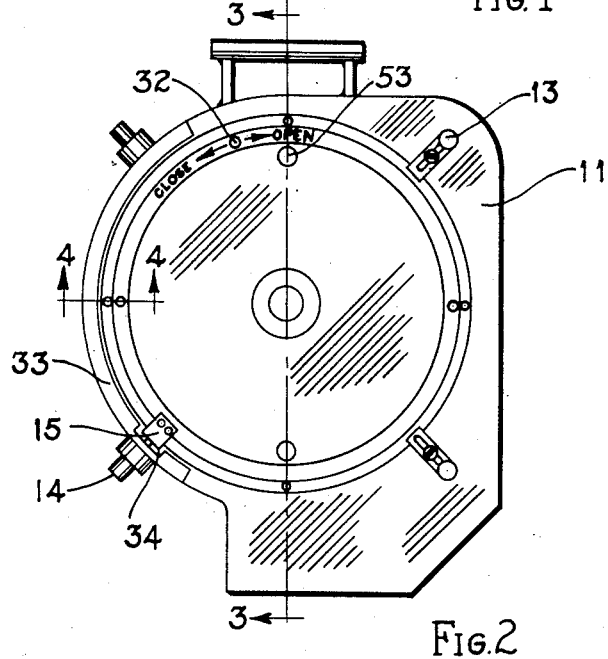
Figure 2 is a view similar to the view of Figure 1 except that the magazine cover is shown removed.

Referring now to the drawings, wherein like reference characters designate like or corresponding parts throughout the several views, there is shown in Figures 1–3 a camera housing 11 within which a magazine assembly 12 is retained by slide fasteners 13 and locking pin 14 which engages a hole in flange plate 15. As shown in Figures 1 and 2 of the drawings, the magazine assembly is shown in the locked position and if it is desired to remove the magazine assembly, the slide fasteners 13 are moved outwardly and locking pin 14, which may be spring loaded, is also moved outwardly, thus permitting the magazine assembly to be removed.

Referring particularly to Figure 3 of the drawings, it can be seen that the magazine assembly 12 consists of a housing 16 that has an aperture 17 on the peripheral edge 18. This opening 17 extends for about ninety degrees on the peripheral edge 18. A motor 19 is shown attached to the bottom side of housing 16 and a threaded bushing 21 is shown pinned to an extension 22 of the shaft of motor 19. A film drum 23 has a bore that permits the film drum to be slip fitted over the outside diameter of the threaded bushing 21 and a locking nut 24 retains the film 23 in position. The film drum 23 has a groove 25 on its outer peripheral edge that is wide enough to accommodate the film that is to be used. This groove 25 holds the film in position and keeps the film from sliding off the ends of the film drum 23.

A rotary shutter 26, having an outside diameter slightly smaller than the inside diameter of housing 16, is rotatably supported within housing 16 and retained in position by ring 27. Rotary shutter 26 has an opening 28 similar to opening 17 in housing 16, and in Figure 3 of the drawing it can be seen that openings 17 and 28 are in alignment and thus light rays could enter the magazine assembly 12 through lens 20 and expose the film 29 on the film drum 23. As shown in Figures 1 and 2 of the drawing, the rotary shutter can be locked in either a closed or opened position as locking pins 14 and 31 are provided to engage a hole in flange plate 15. In Figures 1 and 2, the locking pin 14 is shown engaging flange plate 15, which would lock the rotary shutter 26 in a closed position. When it is desired to move the rotary shutter to the opened position, the locking pin 14 is first pulled outwardly and the rotary shutter 26 can be manually rotated in a clockwise direction until locking pin 31 engages the hole in flange plate 15. Rotary shutter 26 is provided with a stud 32 that facilitates rotating the rotary shutter 26.

Referring now to Figures 2 and 4 of the drawings, it can be seen that a segmental flange member 33 is attached to the camera housing 11, and that the segmental flange member 33 is provided with a slot 34, which is wide enough for the flange plate 15 to pass therethrough. The segmental flange member 33 is so arranged that the rotary shutter 26 is in the closed position when the flange plate 15 is in alignment with slot 34. When the rotary shutter 26 is rotated in a clockwise direction, the flange plate 26 passes under the lip 35 of the flange member 26 and thus cannot be removed. Thus the segmental flange member 33 assures that the magazine assembly can only be removed from the camera housing 11 when the shutter is closed and thus the film 29 on the film drum 23 cannot be accidentally exposed.

Referring particularly now to Figure 4 of the drawings it can be seen that pin 36 protrudes from camera housing 11 and as shown it is depressing pin 37 which is spring loaded by spring 38. Pin 36 serves two functions as it prevents rotation of the housing 16 of the magazine assembly and it depresses pin 37 so that the rotary shutter 26 will be unlocked and free to rotate. It can be seen that when the magazine assembly which includes the magazine housing 16, the rotary film drum 23, and the rotary shutter 26, is removed from the housing 11, pin 37 will engage the hole in housing 16 and thus keep the rotary shutter from rotating. The shutter will be closed and cannot be opened while the magazine assembly 12 is not in the camera housing 11.

Referring again to Figure 3 of the drawings, a second end portion 39 of the shaft of motor 19 extends from the rear of the motor and carries a synchronizing disk 41. A magnetic pickup 42 is supported by bracket 43 such that the magnetic pickup 42 is in close proximity to the synchronizing disk 41. By way of example, the synchronizing disk 41 can be made of aluminum and contain a small rectangular steel slug in its periphery. The magnetic pickup might be of any commercially available type. The magnetic pickup 42 generates a voltage whenever its external magnetic field is distorted, as by the motion of the steel slug in the periphery of disk 41. The generated voltage can be used to actuate a relay or other triggering circuit, and thus a record on the film 29 can be started at any predetermined position. Normally the predetermined position will be the line where the ends of the film are joined.

Figure 5:
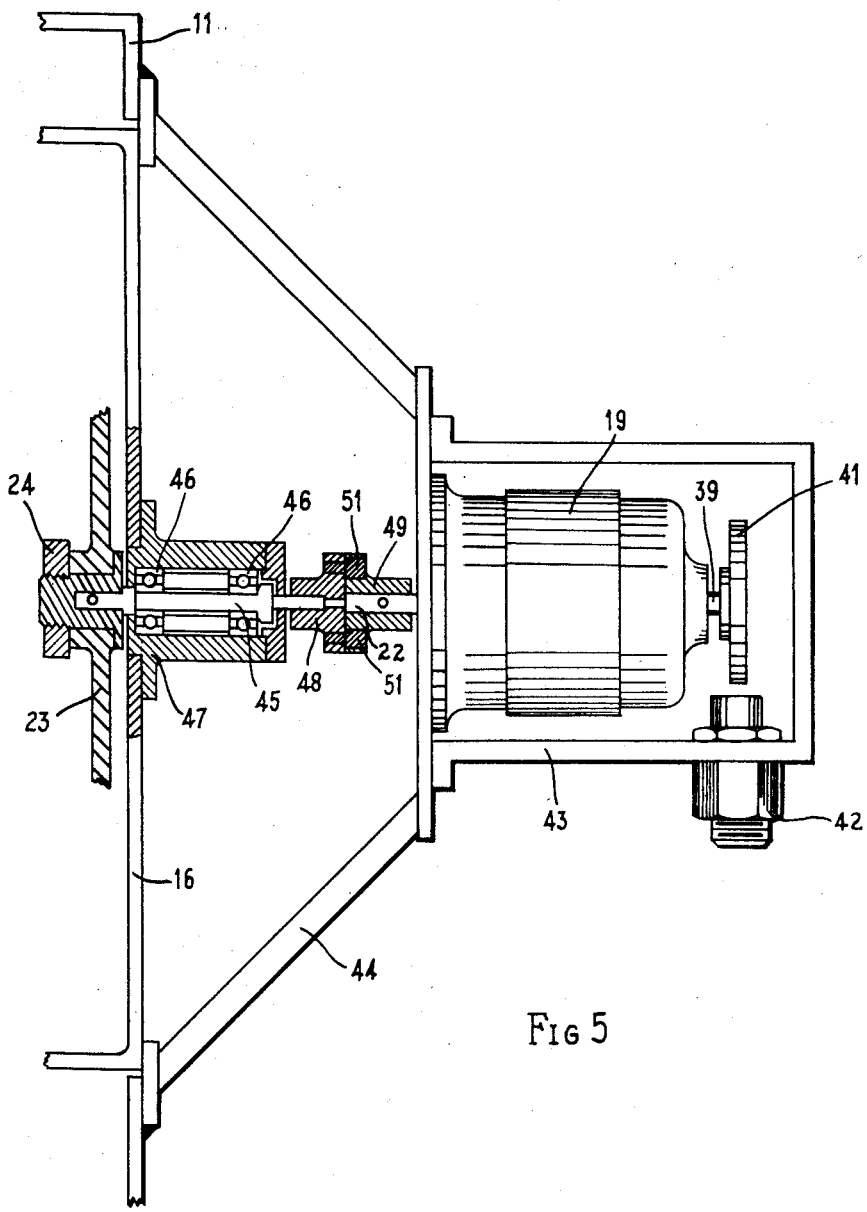
Figure 5 is a view, partly in section, showing a driving motor attached to a camera housing.

It should be noted that the embodiment illustrated in Figure 3 of the drawings shows the motor 19 mounted to the magazine assembly 12 and when the magazine assembly is removed the motor 19 is removed therewith. In Figure 5 of the drawings an alternate method of mounting the motor 19 is shown. Bracket 44 is attached, as by welding, to the camera housing 11, and motor 19 is fastened to bracket 44. Shaft 45 is rotatably mounted in bearings 46, which are retained by bearing block 47. Bearing block 47 is secured to housing 16. Both ends of shaft 45 protrude from bearing block 47, and it can be seen that the film drum 23 can be mounted on the end of shaft 45 that protrudes inside the housing 16. The opposite end of shaft 45 carries a coupling 48 that engages with a coupling 49 that is fixed to shaft 22 of motor 19. Couplings 48 and 49 are easily disengaged, as coupling pins 51, which are press fitted in coupling 49, engage holes in coupling 48, and the magazine assembly 12 can readily be removed from camera housing 11.

In operation the film 29 is first put in position on the film drum 23. This step should be accomplished in a darkroom so that the film 29 will not be exposed. Film can best be put in position by removing the film drum 23 from the magazine assembly 12. Cover 52 is first removed by turning it, if closed, in a counterclockwise direction so that the heads of pins 53 may press through the enlarged portions of elongaged slots 54 that are in the cover 52. Having removed the cover, locking nut 24 is then unscrewed and the film drum 23 can be removed from the magazine assembly 12. A strip of film 29 is wound around the film drum 23 and the ends of the film might be held together by adhesive tape. Another method that might be employed to hold the film in position would be to provide a slit in the periphery of the film drum 23, through which the ends of the film 29 might be drawn and then wedged with a wedging member from the inside.

Having placed the film in position, the film drum 23 is then placed back in the magazine assembly 12 and locking nut 24 screwed on threaded bushing 21 so that the film drum 23 is firmly locked in position. Cover 52 is then placed in position and locked closed. It should be noted that when the magazine assembly 12 is not in the camera housing 11, pin 37 locks rotary shutter 26 to the housing 16 and the rotary shutter 26 cannot be accidentally opened, and thus exposure of the film is avoided. The magazine assembly 12 can be placed in the camera housing at any desired time and when so placed, pin 36 depresses pin 37 which permits the rotary shutter 26 to be manually rotated relative to the housing 16.

The camera housing 11 can next be placed over an oscilloscope or other device that is to have its trace photographed and the shutter 26 can be opened. Motor 19 can then be turned on and allowed to reach desired speed and then a voltage supplied by magnetic pickup 42 can be used to start the trace that is to be photographed.

From the above description, it can be seen that the magazine assembly can be readily inserted or removed from the camera housing 11. The magazine assembly 12 is structurally so designed that it can readily be used with film processing equipment and the film 29 can be processed without its being removed from the magazine assembly 12.

It will be apparent to one skilled in the art that the invention herein disclosed is susceptible of modification in its forms, proportions, detail construction and arrangement of parts, and therefore it is to be understood that the invention is not limited to the specific features shown, but that the means and construction herein disclosed merely comprise a preferred form of putting the invention into effect.

What is claimed is:

1. A photographic camera comprising; a camera housing having a lens therein, a magazine assembly detachably mounted within said housing, said magazine assembly including a magazine housing having an aperture therein, said aperture being adjacent to said lens when the magazine assembly is mounted within the camera housing, an apertured shutter rotatably mounted within said magazine housing, the aperture in said shutter adapted to be aligned with the aperture in said housing, means for releasably locking said shutter to said magazine housing thereby preventing accidental rotation of said shutter, a film drum rotatably mounted within said shutter, and means coupled to said film drum for rotating said film drum at high speed.

2. A photographic camera as set forth in claim 1 wherein said means for rotating said film drum includes a motor attached to said magazine housing.

3. A photographic camera as set forth in claim 1 wherein said means for rotating said film drum includes a motor attached to said camera housing, said motor having an output shaft and coupling means for connecting said output shaft to said film drum.

4. A photograph camera comprising; a camera housing having a lens adaptable for photographing the trace of an oscilloscope, a magazine assembly detachably mounted within said camera housing, said magazine housing having an aperture therein, said aperture being adjacent to said lens when said magazine assembly is mounted within said camera housing, an apertured shutter rotatably mounted within said magazine housing, the aperture in said shutter adapted to be aligned with said aperture in said housing, means releasably locking said shutter to said magazine housing thereby to prevent accidental rotation of said shutter, and a film drum rotatably mounted within said shutter and adapted to receive a strip of film encircling the film drum, the ends of said film being substantially coterminous, means connected to said film drum for rotating the film drum at high speed, and synchronizing means carried by said drum rotating means for indicating the ends of the film.

5. A photographic camera as set forth in claim 4 wherein means for releasably locking said shutter to said magazine housing comprises at least one pin slidably mounted in said shutter, means for biasing said pin, and at least one hole in said magazine housing for receiving said pin to prevent rotation of said shutter in said magazine housing.

6. A photographic camera as set forth in claim 4 wherein said means for rotating said film drum at high speed includes a motor having an output shaft, one end of which is in driving engagement with said film drum; and wherein said synchronizing means includes a synchronizing disk attached to another end of said output shaft, and magnetic pickup means adjacent said synchronizing disk and responsive to the rotation of said disk.

7. A photographic camera comprising; a camera housing having a lens therein; a magazine assembly detachably mounted within said camera housing, said magazine assembly including a magazine housing having an aperture therein, said aperture being adjacent said lens when said magazine assembly is mounted within said camera housing, an apertured shutter rotatably mounted within said magazine housing, the aperture in said shutter being adaptable to be positioned in alignment with said aperture in said housing, means for releasably locking said shutter to said magazine housing thereby preventing accidental rotation of said shutter, and a film drum rotatably mounted within said shutter; means for rotating said film drum at high speed; and means for releasably locking said magazine assembly within said camera housing to prevent removal of said magazine assembly from said camera housing unless said shutter is locked in the closed position to said magazine housing.

8. A photographic camera comprising; a camera housing having a lens adaptable for photographing the trace of an oscilloscope, a magazine assembly adaptable for mounting within said camera housing, said magazine housing having an aperture therein, said aperture being adjacent said lens when said magazine assembly is mounted within said camera housing, a shutter having an aperture therein, said shutter being rotatably mounted within said magazine housing, means for releasably locking said shutter to said magazine housing thereby preventing inadvertent rotation of said shutter, a film drum rotatably mounted within said shutter and adapted to receive a strip of film encircling said film drum, the ends of the film being coterminous, means coupled to the film drum for rotating said film drum at high speed, synchonizing means for indicating the line of joinder of said ends of the strip of film, and means for releasably locking said magazine assembly within said camera housing to prevent removal of said magazine assembly from said camera housing unless said shutter is locked in the closed position to said magazine housing.

9. A magazine for a camera comprising; a housing having an aperture therein, an apertured shutter, rotatably mounted within said housing, the aperture in said shutter being adaptable to be positioned in alignment with the aperture in said housing, means for locking said shutter to said housing thereby preventing accidental rotation of said shutter, a film drum rotatably mounted within said housing, means for rotating said film drum at high speed, a cover, and means for locking said cover to said housing.

10. A camera comprising; a housing having an internal recess, a cover detachably secured to said housing and covering the recess, a removable film magazine disposed within the recess, said magazine comprising; a rotatable film holding drum, a rotatable shutter having a peripheral aperture, said shutter being concentrically disposed about said drum and spaced therefrom to permit relative rotational movement of said shutter and said drum; means secured to said shutter and projecting externally of said housing to facilitate manual rotation of said shutter through a limited angle, non-rotatable lens holding means having an aperture therein disposed adjacent said shutter and aligned with the peripheral aperture in said shutter upon rotation of said shutter to an open position, a lens in said last named means in substantial alignment with the last named aperture to focus light on the periphery of said film holding drum when the aperture in said shutter is in alignment with the second named aperture, and means operatively connected to said film holding drum to rotate said drum.

11. A camera comprising; a casing having an internal recess, a cover detachably secured to said casing and covering the recess, a removable film magazine disposed within the recess, said magazine comprising; a rotatable drum adapted to carry a strip of photographic film along its periphery, a shutter having a peripheral aperture concentrically disposed about said drum and spaced therefrom to permit relative rotational motion of said shutter and said drum, said shutter being movable selectively to an open position and a closed position; means secured to said shutter and projecting externally of said casing to facilitate rotation of said shutter between said open position and the closed position, non-rotatable light admitting means disposed about said casing and having an aperture therein, a lens in said light admitting means in substantial alignment with the last named aperture to focus light on the periphery of said film holding drum when said shutter is in the open position, shutter locking means on said casing, means secured to said shutter for movement therewith and in locking engagement with said shutter locking mean when said shutter is in the open position and disengaged from said shutter locking means to prevent removal of said magazine assembly when said shutter is in open position.

12. A camera comprising; a casing having an internal recess, a cover detachably secured to said casing and normally covering the recess, a removable film magazine disposed within the recess, said magazine comprising; a rotatable drum adapted to receive a strip of film along its periphery, a rotatable shutter having a peripheral aperture therein, said shutter being concentrically disposed about said drum and spaced therefrom to permit relative rotational motion of said shutter and said drum; means secured to said shutter and projecting externally of said casing to facilitate rotation of said shutter through a limited angle, a non-rotatable casing means disposed adjacent to said shutter and having an aperture, a lens disposed in said casing means in substantial alignment with the last named aperture to focus light at the periphery of said film holding drum when the aperture in said shutter is in alignment with said second aperture, a motor having a rotatable shaft operatively connected at one end thereof to said drum and a synchronizing disc indicating the angular position of said drum and mounted on the other end of said shaft for rotation therewith, and means responsive to rotation of said synchronizing disc to produce an output voltage during each revolution of said disc.

References Cited in the file of this patent

UNITED STATES PATENTS

| 1,223,332 | Akeley | Apr. 17, 1917 |
| 1,871,379 | Legg | Aug. 9, 1932 |
| 2,186,612 | Mihalyi | Jan. 9, 1940 |
| 2,505,469 | Gerardin | Apr. 25, 1950 |
| 2,551,597 | Hall | May 8, 1951 |
| 2,645,169 | Hayward et al. | July 14, 1953 |
| 2,726,919 | Hathaway et al. | Dec. 13, 1955 |

FOREIGN PATENTS

| 897,848 | France | June 12, 1944 |